(12) United States Patent
John et al.

(10) Patent No.: US 8,024,779 B2
(45) Date of Patent: Sep. 20, 2011

(54) VERIFYING USER AUTHENTICATION

(75) Inventors: Pramod John, Hayward, CA (US); Ramachandran V. Marti, Sunnyvale, CA (US); Yingxian Wang, San Jose, CA (US); Maxine R. Erlund, Cupertino, CA (US)

(73) Assignee: PacketMotion, Inc., San Jose, CA (US)

(*) Notice: Subject to any disclaimer, the term of this patent is extended or adjusted under 35 U.S.C. 154(b) by 1036 days.

(21) Appl. No.: 11/398,028

(22) Filed: Apr. 4, 2006

(65) Prior Publication Data

US 2006/0190736 A1 Aug. 24, 2006

Related U.S. Application Data

(63) Continuation-in-part of application No. 11/042,842, filed on Jan. 25, 2005.

(60) Provisional application No. 60/548,047, filed on Feb. 26, 2004.

(51) Int. Cl.
  *G06F 17/30* (2006.01)
(52) U.S. Cl. ..................... 726/4; 726/3; 726/2
(58) Field of Classification Search .................. 726/4, 3, 726/2
  See application file for complete search history.

(56) References Cited

U.S. PATENT DOCUMENTS

| 5,774,650 | A | 6/1998 | Chapman et al. |
| 5,787,253 | A | 7/1998 | McCreery et al. |
| 6,219,706 | B1 | 4/2001 | Fan et al. |
| 6,233,577 | B1 | 5/2001 | Ramasubramani et al. |
| 6,292,838 | B1 | 9/2001 | Nelson |
| 6,301,658 | B1 | 10/2001 | Koehler et al. |
| 6,466,932 | B1 | 10/2002 | Dennis et al. |
| 6,519,571 | B1 | 2/2003 | Guheen et al. |
| 6,553,428 | B1 | 4/2003 | Ruehle et al. |
| 6,622,151 | B1 | 9/2003 | Hamamoto et al. |
| 6,651,099 | B1 | 11/2003 | Dietz et al. |
| 6,662,227 | B2 | 12/2003 | Boyd et al. |
| 6,804,701 | B2 | 10/2004 | Muret et al. |

(Continued)

FOREIGN PATENT DOCUMENTS

EP 1054529 A2 11/2000

OTHER PUBLICATIONS

PacketMotion Product Overview, printed out in year 2009.*

(Continued)

*Primary Examiner* — David Y Jung
(74) *Attorney, Agent, or Firm* — Nixon Peabody LLP

(57) ABSTRACT

A solution for transparently verifying the authentication of a real user includes a monitor that receives network packets and a collector. The monitor identifies an authentication exchange packet from network traffic, extracts information from the packet and sends it to the collector, which obtains objects from a directory service and determines if the information includes a user name equivalent to a name attribute in an object. If so, authentication is deemed verified. For additional verification, the monitor extracts from the packet a destination address if it is an response packet, or a source address if it is a request packet. Monitor sends the extracted address to the collector, which uses the extracted address to obtain a hostname and determines whether a user account associated with the name attribute is active on a computing device having the hostname. If so, the authentication of the real user is deemed further verified.

48 Claims, 3 Drawing Sheets

U.S. PATENT DOCUMENTS

| | | |
|---|---|---|
| 6,871,284 B2 | 3/2005 | Cooper et al. |
| 6,983,379 B1 | 1/2006 | Spalink et al. |
| 7,020,082 B2 | 3/2006 | Bhagavath et al. |
| 7,085,936 B1 | 8/2006 | Moran |
| 7,133,916 B2 | 11/2006 | Schunemann |
| 7,216,162 B2 | 5/2007 | Amit et al. |
| 7,433,943 B1 | 10/2008 | Ford |
| 2001/0032258 A1 | 10/2001 | Ishida et al. |
| 2001/0039579 A1 | 11/2001 | Trcka et al. |
| 2002/0032855 A1 | 3/2002 | Neves et al. |
| 2002/0110084 A1 | 8/2002 | Butt et al. |
| 2002/0131764 A1 | 9/2002 | David et al. |
| 2003/0135553 A1 | 7/2003 | Pendakur |
| 2003/0163581 A1 | 8/2003 | Moran et al. |
| 2003/0172143 A1 | 9/2003 | Wakayama |
| 2003/0177383 A1 | 9/2003 | Ofek et al. |
| 2004/0008972 A1 | 1/2004 | Haken |
| 2004/0049294 A1 | 3/2004 | Keene et al. |
| 2004/0071130 A1 | 4/2004 | Doerr et al. |
| 2004/0078391 A1 | 4/2004 | Excoffier et al. |
| 2004/0088537 A1 | 5/2004 | Swander et al. |
| 2004/0117434 A1 | 6/2004 | Bantz et al. |
| 2004/0133589 A1 | 7/2004 | Kiessig et al. |
| 2004/0254919 A1 | 12/2004 | Giuseppini |
| 2005/0050338 A1 | 3/2005 | Liang et al. |
| 2005/0089048 A1 | 4/2005 | Chittenden et al. |
| 2006/0123078 A1 | 6/2006 | Mendiola et al. |
| 2007/0050846 A1 | 3/2007 | Xie et al. |

OTHER PUBLICATIONS

PacketMotion Corporate Overview, printed out in year 2009.*
PacketMotion Interview, printed out in year 2009.*
Per Packet Authentication for IEEE 802.11 wireless LAN; Junaid, M.; Akbar, M.; Mufti, M.; Multitopic Conference, 2008. INMIC 2008. IEEE International Publication Year: 2008 , pp. 207-212.*
One-Pass Authentication and Key Agreement Procedure in IP Multimedia Subsystem for UMTS Huang, C.-M.; Li, J.-W.; Advanced Information Networking and Applications, 2007. AINA '07. 21st International Conference on Publication Year: 2007 , pp. 482-489.*
Packet level access control scheme for internetwork security Iqbal, M.S.; Poon, F.S.F.; Communications, Speech and Vision, IEE Proceedings I vol. 139 , Issue: 2 Publication Year: 1992 , pp. 165-175.*
Office Action for U.S. Appl. No. 11/042,842, mailed Feb. 12, 2009.
Office Action for U.S. Appl. No. 11/042,842, mailed Sep. 21, 2009.
Office Action for U.S. Appl. No. 11/398,013, mailed May 12, 2010.
Office Action for U.S. Appl. No. 11/398,014, mailed Jul. 23, 2010.
Claycomb, W.R., Shin, Dongwan; "Threat modeling for virtual directory services"; Security Technology, 2009. 43rd Annual 2009 International Carnahan Conference on Oct. 5-8, 2009, pp. 149-154.
Yang, C.S., Liu, C.Y.; Chen, J.H.; Sung, C.Y.; "Design and implementation of secure Web-based LDAP management system"; Information Networking, 2001. Proceedings. 15th International Conference on Jan. 31-Feb. 2, 2001; pp. 259-264.
Office Action for U.S. Appl. No. 11/398,013, mailed Jan. 9, 2009.
Office Action for U.S. Appl. No. 11/398,014, mailed Jul. 9, 2009.
John Sawyer, "Packet Motion Sentry 2.0.3" Network Computing, Network & System Management, Feb. 13, 2006.
Closing internal User Visibility and Data Governance Gaps with PacketMotion, SANS Institute, Mar. 2008.
Office Action for U.S. Appl. No. 11/042,842, mailed Mar. 8, 2010.
Office Action for U.S. Appl. No. 11/440,663, mailed Mar. 3, 2010.
Notice of Allowance for U.S. Appl. No. 11/398,014, mailed Feb. 23, 2010.
Hassler, V.; "X.500 and LDAP Security: a comparative overview"; Network, IEEE vol. 13, Issue 6, Nov.-Dec. 1999, pp. 54-64.
Office Action for U.S. Appl. No. 11/398,013, mailed Jan. 20, 2011.
Notice of Allowance for U.S. Appl. No. 11/398,014, mailed Feb. 28, 2011.
Notice of Allowance for U.S. Appl. No. 11/398,014, mailed Mar. 18, 2011.
Office Action in U.S. Appl. No. 11/440,663, mailed Oct. 13, 2010.
Office Action in U.S. Appl. No. 11/042,842, mailed Oct. 13, 2010.

* cited by examiner

VERIFYING USER AUTHENTICATION

CROSS-REFERENCE TO RELATED APPLICATIONS

This application is a continuing-in-part application, which claims the benefit of United States patent application, entitled "Secure Enterprise Network", having Ser. No. 11/042,842 and a filing date of 25 Jan. 2005, which in turn claims the benefit of United States provisional patent application, entitled "Secure Enterprise Network," having Ser. No. 60/548,047 and the filing date of 26 Feb. 2004.

FIELD OF THE INVENTION

The present invention generally pertains to network security. More specifically, the present invention pertains to verifying the authentication of a user on a computer connected to a networked environment.

BACKGROUND OF THE INVENTION

The term "computer network" generally refers to a system for enabling communication between or among computers or equivalent computing devices. When configured to include a server providing a directory service, the computer network becomes an integrated distributed computing environment, hereinafter referred to as a "networked environment, where participating devices and users of these devices may utilize network resources, such as by using or sharing data or attached peripherals, or communicate with each other.

In order to use these network resources, a user, sometimes referred to as a real user, usually logs onto the networked environment that provides access to these network resources. Attempting to log-on to a networked environment initiates an authentication process. During the authentication process, the user will attempt to log-on to networked environment by entering a user name and password on a computing device. The device will then request credentials from an authentication service provided by the networked environment.

The computing device sends the request for credentials to the authentication service in the form of an authentication request packet that includes the user name. If the user name is valid, the authentication service will authenticate the user name of the real user by, among other things, replying with an authentication response packet, which may contain a session key encrypted using the user's password. The session key permits the real user's computing device to use and communicate with network resources on the networked environment. The authentication request packet and authentication response packet are sometimes respectively referred to as an authentication exchange request packet and an authentication exchange response packet under the Kerberos protocol.

However, the above approach is limited because it is primarily perimeter-based. Once the user name of a real user is authenticated, the real user can obtain access to network resources with minimal restrictions other than those provided by the security policy, which is defined in a directory service provided on the networked environment, for that user name. If the user name has full administrative authority under the security policy, then the real user utilizing the user name receives full access to network resources. If a real user obtains authentication for a user name for which the real user is not authorized to use, such a situation can lead to a disastrous compromise of network security since once authenticated on the network, the real user will have unrestrained access to network resources.

Consequently, a need exists for improved systems and methods for verifying the authentication of a user name after the user name has been authenticated on a networked environment.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE EMBODIMENTS OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having benefit of the herein disclosure.

In addition, for clarity purposes, not all of the routine features of the embodiments described herein are shown or described. It is appreciated that in the development of any such actual implementation, numerous implementation-specific decisions must be made to achieve the developer's specific goals. These specific goals will vary from one implementation to another and from one developer to another. Moreover, it will be appreciated that such a development effort might be complex and time-consuming but would nevertheless be a routine engineering undertaking for those of ordinary skill in the art having the benefit of the herein disclosure.

Element numbers are used throughout this disclosure, including the drawings. The variable "n" is used to indicate the total number of element instances, which may be equal to or greater than the number two.

Figure 1:
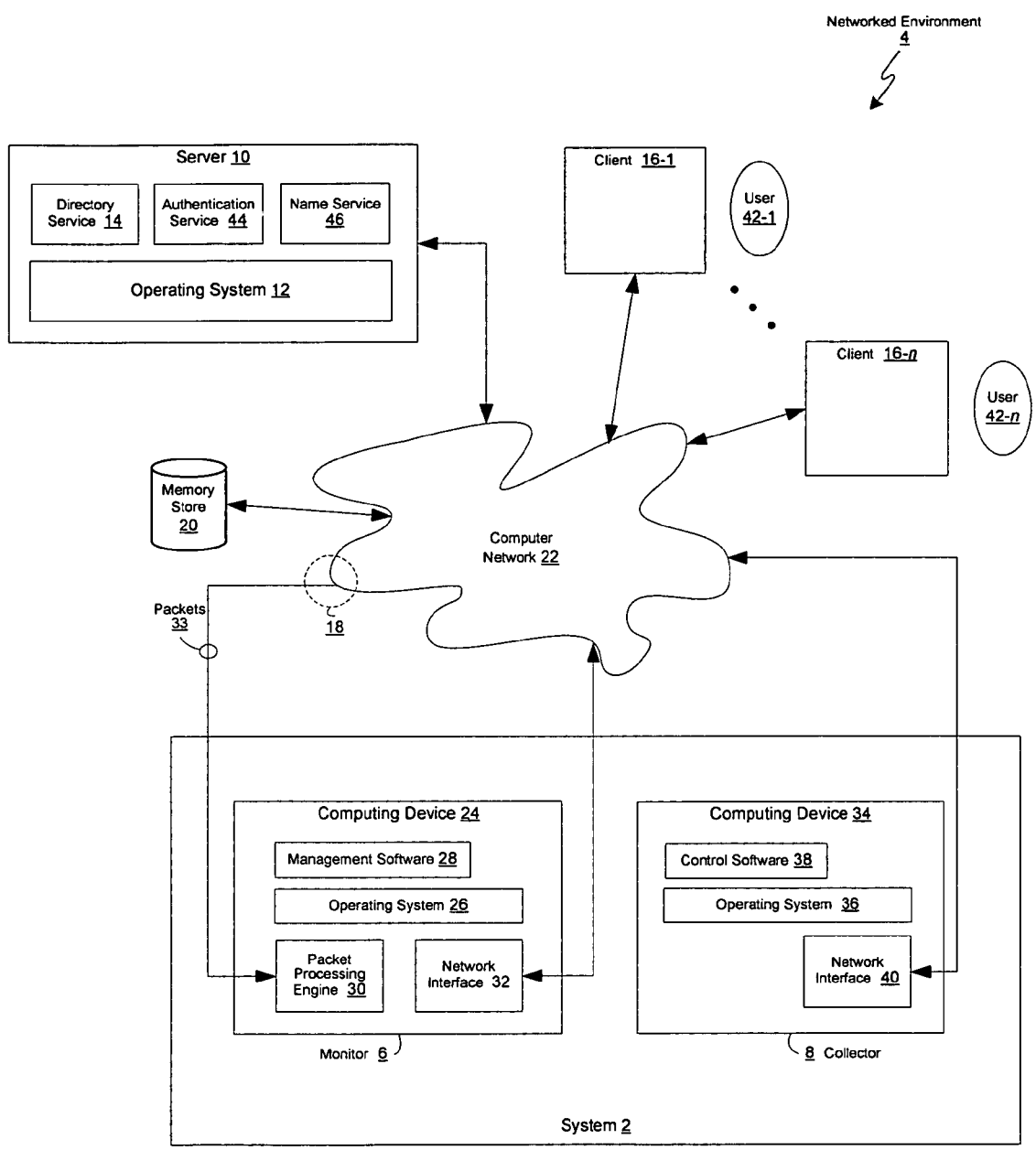
FIG. 1 is a block diagram of a computer system for verifying the authentication of a real user in accordance with one embodiment of the present invention.

FIG. 1 illustrates a system 2 for verifying the authentication of a real user on a networked environment 4, in accordance with one embodiment of the present invention. System 2 includes a monitor 6 and a collector 8, and is intended for use with a networked environment 4 that includes a server 10 having an operating system 12 and a software application that provides directory services, hereinafter directory service 14, to one or more computing devices, such as clients 16-1 and 16-n, which may request and receive directory services from server 10 using a suitable computer network 22. Attachment point 18 and memory store 20 are also shown and may either be part of networked environment 4 or system 2.

Monitor

Monitor 6 may be implemented using a computing device 24 having at least an operating system 26 and a software application, hereinafter called management software 28, a system bus having at least one expansion slot (not shown) suitable for coupling to a packet processing engine 30, and a network interface 32 for coupling to collector 8 using networked environment 4 via computer network 22. Computing device 24 may be any computer having at least one CPU, a motherboard having system memory, a chipset for supporting the functions of the motherboard, user interfaces, such as keyboard, mouse and monitor and the system bus, and mass storage, such as a hard disk drive. The system bus may be any bus or interconnect, such as PCI, PCI-X, Hypertransport, PCI express and the like, that is suitable for coupling to the packet processing engine selected, such as packet processing engine 30.

Network interface 32 may be any interface suitable for connecting to computer network 22. For example, if computer network 22 is implemented in the form of a packet-switched Ethernet network, then network interface 32 would be implemented using an Ethernet-compatible network interface card or equivalent. Network interface 32 may be any interface suitable for connecting to computer network 22. For example, if computer network 22 is implemented in the form of a packet-switched Ethernet network, then network interface 32 would be implemented using an Ethernet-compatible network interface card or equivalent. In another example, computer network 22 is implemented so that it complies with a cell relay network protocol, such as the ATM (Asynchronous Transfer Mode) protocol, requiring a device, such as computing device 24, connected to computer network 22 to have a network interface, such as network interface 32, that is compatible with the cell relay network protocol or ATM protocol. The ATM protocol is commonly known by those of ordinary skill in the art.

In the example shown in FIG. 1, computing device 24 may be implemented using a motherboard having the model designation "X6DVA-EG" from Supermicro Computer, Inc. of San Jose, Calif. Computing device may be configured with a single 3.60 GHz Xeon processor, one gigabyte of system memory, an 80 GB hard disk drive, an Ethernet-compatible network interface, which is used to implement network interface 32, and an operating system in the form of Linux®, such as the Linux® operating system, version 2.4.28, available from www.kernel.org, which is maintained by The Kernel Dot Org Organization, Inc. of Palo Alto, Calif.

Packet Processing Engine

Packet processing engine 30 may be implemented using a packet processing engine that can receive and process, which includes inspecting and filtering, packets, such as packets 33, received from attachment point 18, according to criteria specified by management software 28. In one embodiment of the present invention, packet processing engine 30 is implemented using a programmable packet processing engine having the model designation "ENP-2611", from RadiSys Corporation of Hillsboro, Oreg. In this implementation, packet processing engine 30 includes at least one Ethernet port (not shown) for attaching to and receiving packets from attachment port 18. Implementing packet processing engine 30 using model ENP-2611 is not intended to limit the present invention in any way. One of ordinary skill in the art after receiving the benefit of the herein disclosure would readily recognize that other types of network packet processing devices may be used that have the functionality disclosed herein. For example, a general purpose computer may be used alone or in conjunction with at least one network processor, Application Specific Integrated Circuits (ASICs), or a combination of these to provide the disclosed network packet processing disclosed herein. Network processors are commonly known, such as the IXP2400 Network Processor, from Intel Corporation, of Santa Clara, Calif.

Collector

Collector 8 may be implemented using a computing device 34 having at least an operating system 36, a software application, hereinafter referred to as control software 38, and a network interface 40 for connecting to networked environment 4 via computer network 22. Computing device 34 may be any computer having at least one CPU, a motherboard having system memory, a motherboard chipset, mass storage, such as a hard disk drive. For example, computing device 34 may be implemented using the model having the designation "Proliant Dual 140" from Hewlett-Packard of Palo Alto, Calif. The Proliant Dual 140 is configured with a single 3.60 GHz Xeon processor, one gigabyte of system memory, at least one PCI-x expansion slot, an 80 GB hard disk drive and an Ethernet-compatible network interface, which is used to implement network interface 40. In one embodiment of the present invention, computing device 34 operates using Red Hat Enterprise Linux® WS 2.1, available from Red Hat, Inc. of Raleigh, N.C.

In an alternative example of an embodiment of the present invention, collector 8 may include an additional network interface (not shown) which may be used to directly connect to network interface 32, enabling monitor 6 and collector 8 to communicate with each other without the use of networked environment 4.

Computing devices, such as computing device 24 and 34 are known, and thus, a detailed discussion and view of the hardware configuration of computing device 22 and 40 is not provided to avoid over-complicating the herein discussion.

Networked Environment

Networked environment 4 may be implemented using a client-server network application architecture, which is commonly known by those of ordinary skill in the art, and a computer network, such as computer network 22, having a topology and a physical media suitable for supporting the various embodiments disclosed herein, such as a computer network configured to have a packet-switched network topology using the TCP/IP protocol suite on twisted-pair copper physical media. Using a client-server network application architecture, the TCP/IP protocol or twisted-pair copper media is not intended to be limiting in any way. Other types of may be used. For example, other networking protocols, such as OSI (Open Systems Interconnection), or data link protocols, such as ATM (Asynchronous Transfer Mode), may be used in lieu of the TCP/IP protocol. The ATM and OSI protocols are commonly known by those of ordinary skill in the art.

Any type of distributed network architecture may be used as long as devices, such as clients 16-1 through 16-n, and authenticated real users, such as real users 42-1 through 42-n, who have logged-on to clients 16-1 through 16-n, respectively, can request and receive directory services, such as from directory service 14. For example, networked environment 4 may provide access to a server, such as server 10, running a Windows® brand operating system, such as Windows® 2003 Server, which typically includes Active Directory. Active Directory is a LDAP-based directory service and is a product of Microsoft Corporation, of Redmond, Wash.

The various embodiments of the present invention disclosed herein are not limited to Windows® brand operating systems or to Active Directory. Other types of operating systems may be used, including UNIX, Linux®, BSD and other UNIX variants, Solaris, Mac OS X and the like. In addition, other types of software applications may be used instead of Active Directory to provide directory services. For example, one of ordinary skill in the art having the benefit of the herein disclosure would recognize that Sun Java Enterprise, available from Sun Microsystems, Inc., of Sunnyvale, Calif.; eDirectory, available from Novell, Inc. of Provo, Utah; and Red Hat Directory Server, available from Red Hat, Inc., Apache Directory Server, available from Apache Software Foundation of Forest Hill, Md., are example directory services that may be used with the various embodiments of the present invention as described herein. Other directory services exist but are not listed to minimize over-complicating this herein disclosure. Further, OpenLDAP, the Kerberos network authentication protocol, hereinafter "Kerberos Protocol", and Samba software may be used to create the directory service functionality described for Active Directory.

The term "directory service" is intended to include a software application that complies with the X.500 standard, which is a commonly known standard developed by the ITU (International Telecommunication Union) and ISO (International Organization for Standardization). A LDAP-based directory service is commonly known and is based on the X.500 standard but uses the TCP/IP protocol. The term "LDAP" is also commonly known and is an acronym for Light Weight Directory Protocol, which is a networking protocol for querying, searching and modifying directory services running over TCP/IP. LDAP is defined in terms of the Abstract Syntax Notation one, also referred to as ASN.1, which is a joint standard managed by ISO, and the ITU-T (ITU Telecommunication Standardization Sector). ASN.1 is a standard notation for describing data structures used for representing, encoding, transmitting and decoding data. LDAP is suitable for accessing an X.500 standard-compliant directory service, such as Active Directory.

A directory service is typically used to define, manage and authenticate network entities, such as computing devices, services and real users. Each network entity is treated as an object by the directory service. Each object has a unique name and a set of attributes, and represents a single network entity, such as a user, a computer, a printer, an application, or a shared data source and their respective attributes ("object attributes"). A directory service, such as Active Directory, creates and manages these objects using a hierarchical framework. This framework arranges objects into three broad categories: resources, such as printers; services; and people, such as users and groups. A directory service manages these objects by enabling information to be read from or written to the objects, controlling access to the objects and enforcing security policies defined for the objects.

This framework may include arranging these objects to belong to a domain. A directory service, such as Active directory, manages the domain in a "namespace" using its DNS name structure. The objects held within a domain can be grouped into containers called, "organizational units". The organizational unit is one level to apply group policies, called group policy objects in Active Directory.

Figure 2:
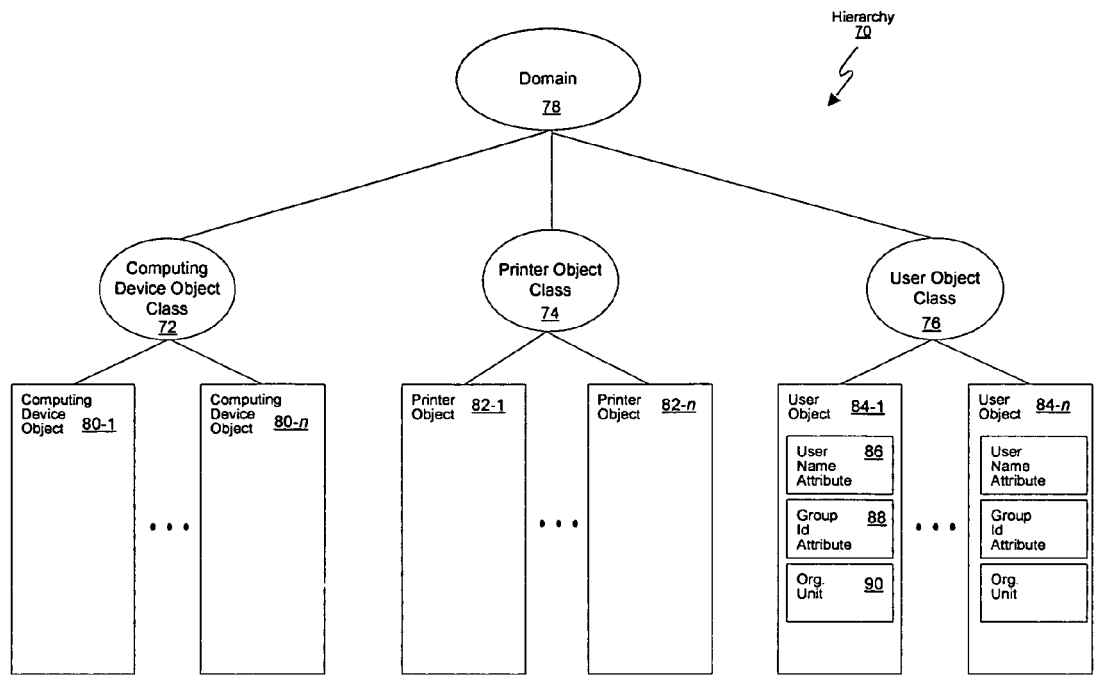
FIG. 2 is a block diagram of an example directory service hierarchy in accordance with yet another embodiment of the present invention.

Turning now to FIG. 2, directory service 14 may have a hierarchy 70 organized according to a selected manner by a system administrator of networked environment 4. Each object in the directory service is typically uniquely identified in the directory and uniquely named for a given namespace, such as a domain. Each object is of a particular object class. For example, hierarchy 70 may include a computing device object class 72, a printer object class 74 and a user object class 76 in a domain 78. Computer objects 80-1 through 80-n may represent computing devices, such as clients 16-1 through 16-n, respectively, and belong to computing device object class 72, while printer objects 82-1 through 82-n may represent printers and belong to printer object class 74. Further still, user objects 84-1 through 84-n may represent real users, such as real users 42-1 through 42-n, respectively, and belong to user object class 76.

Each object may have more than one attribute, and each attribute may contain a value. Object attributes define the characteristics of and information related to the entity represented by the object containing the object attributes. For example, a set of attributes defined in user object 84-1 may include user information related to a real user, such as user name attribute 86, group ID attribute 88 and organizational unit attribute 90. User name attribute 86 may be in the form of an email address that has a suffix portion that includes the domain name established for the networked environment and a prefix portion that is unique to the real user. For example, in one embodiment of the present invention, a user name of: "jdoe@packetmotion.com" may be used for real user 42-1. In Active Directory, the user name attribute in a user object is referred to as the "UserPrincipalName" attribute and requires a value that has an e-mail address format, such as the format disclosed in the example above.

A directory service stores objects in a database, or equivalent memory store, according to a selected model, referred to as a schema. The collection of objects stored in the database is sometimes referred to as a directory. The directory service functions as an interface to the database and provides access to objects stored in the database.

Access to the directory service may be accomplished by using LDAP, and the Kerberos Protocol may be used to authenticate network entities seeking access to resources on networked environment 4. The Kerberos Protocol is commonly known and not intended to limit in any way the scope and spirit of the present invention as described in the various embodiments disclosed herein. Other types of network authentication protocols may be used if the protocol selected supports the directory service used. The term "network packet" or alternatively, "packet" is intended to mean the basic unit in which data is transmitted on a packet switched network, such as networked environment 4.

Figure 3:
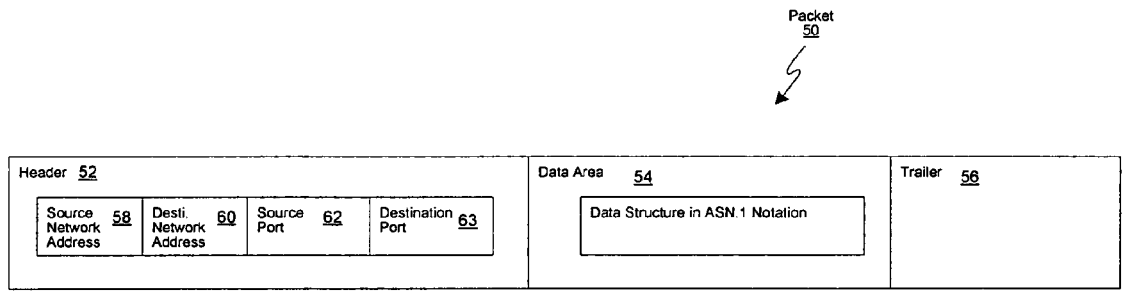
FIG. 3 is a block diagram of an example authentication network packet in accordance with another embodiment of the present invention.

As shown in FIG. 3, a packet 50 consists of three main elements: a header 52, a data area 54 and a trailer 56. Header 52 includes information describing the source and destination of the packet. The source of the packet is in the form of the network address of the network entity that created the packet and may be referred to as a source network address 58. The destination of the packet is in the form of the network address of the intended network entity recipient of the packet and may be referred to as a destination network address 60.

Header 52 also includes two port numbers that are respectively designated as a source port number 62 and a destination port number 63. A port number, sometimes also referred to as a port ID, is commonly used to label a packet to be of a certain type. For example, the number "88" is commonly used to designate the packet as a Kerberos authentication exchange packet when used as a source or destination port ID. Thus, if a port ID of "88" is used as a source or destination port ID, it may indicate that the packet is possibly a Kerberos authentication exchange packet but the association between a packet having a source or destination port ID of "88" and an actual Kerberos authentication exchange packet is not absolute since port ids may not be consistently used or applied in a networked environment. The term "Kerberos authentication exchange packet" includes packets commonly referred to as Kerberos authentication request packets or Kerberos authentication response packets.

The data area 54, sometimes referred to as the "payload," contains the data intended to be transmitted by the network entity. Since its fifth version, a Kerberos authentication exchange packet contains content in data area 54 that complies with the ASN.1 notation. In accordance with one embodiment of the present invention, monitor 6 identifies a Kerberos authentication exchange packet by decoding the ASN.1 formatted content in data area 54 to determine whether the content is a Kerberos authentication exchange packet. For example, if the ASN.1 notation used in data area 54 describes a data structure specific to that used in a Kerberos authentication exchange packet, then monitor 6 will designate that packet as a Kerberos authentication exchange packet. This data structure is defined in RFC Title 1510, September 1993, available from the Internet Engineering Task Force (IETF) of the Internet Society (ISOC) of Reston, Va. (hereinafter "RFC 1510").

In addition to, or in lieu of, decoding the contents of data area 54, monitor 6 may identify Kerberos authentication exchange packets from other packets by designating packets that each have a source or destination port ID of "88" as Kerberos authentication exchange packets.

Authentication exchange packets on a networked environment, such as networked environment 4, are typically generated when an entity, such as client 16-1, requests credentials to obtain access to a network entity, such as directory service 14, on networked environment 4. For example, under the Kerberos protocol, such a request may be in the form of a real user, such as real user 42-1, engaging in a network log-on transaction using client 16-1 to enter a user name and password. During this log-on transaction, client 16-1 sends an authentication exchange request packet to an authentication service 44, which in one embodiment of the present invention is provided by directory service 14. The authentication exchange request packet includes user information in the form of a user name, which is referred to as a principal name under the Kerberos protocol.

Under the Kerberos Protocol, a third party authentication service, such as authentication service 44 in FIG. 1, functions as a trusted source from whom network entities on a networked environment, such as real users 42-1 through 42-n, respectively share a password, commonly referred to as a "secret-key". A network entity, such as real user 42-1, uses a secret-key to prove that she is who she claims to be. Using a database, table or equivalent, the authentication service 44 maps each secret-key for each network entity according to a name defined for the network entity. The Kerberos protocol refers to each name as a "principal name". Each principal name is in the format consistent with the naming convention used by directory service 14, such as a real user's e-mail address used on networked environment 4. For example, the e-mail address may be in the form of a prefix before the "@" symbol and a suffix after the "@" symbol, where the prefix is unique to each real user on networked environment 4 and the suffix is the domain served by the directory service 14.

The Kerberos protocol also defines the method of exchanging this secret-key, which is sometimes referred to as an "authentication exchange" process. Under this process, an initiator, such as client 16-1 used by real user 42-1, sends an authentication exchange request to the authentication service 44 seeking credentials to access a target network entity. This request is in the form of an authentication exchange request packet, which contains at least the initiator's principal name and the target network entity's principal name.

Upon receipt, the Authentication service 44 checks whether the principal names received are valid by, among other things, determining whether the principal names of the initiator and target network entity are in the authentication service 44 database.

If the principal names are found valid, authentication service 44 responds with an authentication exchange response packet that contains the principal names previous sent, the initiator's network address and the credentials requested, including the current time, a lifetime value and a temporary encryption key, called a "session key". The authentication service 44 encrypts the contents of the authentication exchange response packet using the initiator's secret-key, which the authentication service 44 obtains from its database, such as by using the initiator's name as an index. After receiving the authentication exchange response packet, the initiator decrypts it by using the initiator's secret key, enabling the initiator to obtain the session key.

The session key can be used to decrypt messages that were encrypted using either the initiator's secret-key or the target network entity's secret-key. Thus, after obtaining the session key, the initiator can encrypt packets using the session key and then send the encrypted packets to the target network entity. Upon receipt, the target network entity can then decrypt the packets using the target network's secret-key, which it already possesses.

Referring again to FIG. 1, server 10 may also provide a name service, such as name service 46, by mapping the names of network resources, such as client 16-1 through 16-n, to their respective network addresses, referred to as IP addresses in a networked environment that uses the TCP/IP protocol suite. Mapping clients with their respective network addresses, permits name service 46 to return the name, sometimes referred to as "hostname", of the client upon receiving the client's network address or vice versa. For example, if a client 46-1 having the device name of "jdoe_dtop" is designated with an IP address of 192.1.0.100, the name service will return the name "jdoe_dtop" if it receives an IP address of 192.1.0.100. In the reverse, if the name service receives the device name "jdoe_dtop", it will perform a reverse lookup and return the IP address of the device having hostname "jdoe_dtop", which in this example is 192.1.0.100. Name services are commonly known. One of ordinary skill in the art would readily recognize without undue experimentation after receiving the benefit of this disclosure that alternative name services may be employed. For example, a server providing DNS (Domain Name System) services may be accessed or used to provide a name service. In addition, WINS (Windows Internet Naming Service) or other name services may be used. DNS, WINS and NetBIOS Name Server are commonly known.

Computer network 22 enables computing devices to connect and communicate with other devices that are also coupled to networked environment 4. Computer network 22 may be implemented using any physical media that can support the transmission protocol used in networked environment 4. In addition, various types of physical media may be used instead of twisted pair copper physical media, including fiber, coax, wireless and the like.

Attachment point 18 may be implemented using a network tap or a switch having spanning port or mirror port functionality, which are commonly known. A network tap is typically installed on a computer network segment, such as between two switches on a packet-switched network topology, and either splits or regenerates the network packets transmitted through the segment, creating a duplicate set of network packets that may then be sent to a connected device. A switch having a mirror port typically indicates that the switch can copy network packets received in one standard switch port and to another switch port, which is referred to as a "mirror" port. Unlike standard switch ports, a mirror port cannot support bidirectional traffic and can only transmit the copied or duplicated network packets to connected device. A switch having a spanning port typically indicates that the switch can copy network packets received from all standard switch ports available on the switch to a single spanning port. Unlike standard switch ports, a spanning port cannot support bidirectional traffic and can only transmit the copied or duplicated network packets to a connected device. In FIG. 1, monitor 6 functions as the connected device receiving the duplicated network packets in the above example. It is contemplated that attachment point 18 is strategically placed on computer network 22 so that network traffic transmitted on computer network is duplicated and transmitted to monitor 6. For example, if attachment point 18 is implemented using a switch having a spanning port (not shown), the standard switch ports of the switch either directly or indirectly connect to all computer network segments that comprise computer network 22.

The term "client" includes any computing device that can request and use application functionality, such as directory services, provided by a server, such as server 10, operating on networked environment. In another embodiment of the present invention, the term client may also include any computing device that can respond to a query seeking the log-on status of users having a user account on the client. For example, client 16-1 may be configured with the Microsoft Windows® brand of operating system, such as Windows® XP, to receive and reply to user account query sent by another device using the SMB protocol. SMB, which is an acronym for Server Message Block, protocol is commonly known and a network protocol that supports the sharing of data, files, resources and permits authenticated inter-process communication between computing devices in a networked environment, such as between collector 8 and client 16-1 on a computer network 22.

Using the Windows® operating system or the SMB protocol to submit a user account query to client 16-1 is not intended to limit the present invention in any way. Other types of operating systems can support a user account query, such as UNIX, which includes the "who" remote shell command that is similar to the user account query supported by the Windows® operating system. SAMBA is commonly known suite of software applications for defining and operating a computer network and includes an open source implementation of the SMB protocol.

The term "computing device" includes any device, such as a general purpose general, server, hand-held device or the like, that includes an operating system, a network interface compatible with computer network 22, and capable of executing application programs or program code. The term "server" is a subset of computing devices and primarily provides application functionality to another device connecting or connected to networked environment 4. Such application functionality may include directory services, mass storage services, e-mail services, web services and other functionality. The term "node" includes any computing device, such as system 2, clients 16-1 through 16-n, server 10 and memory store 20, operating on a networked environment, such as networked environment 4 and using a unique network address that was previously granted to the node either manually or automatically, such as through a DHCP, also known as Dynamic Host Configuration Protocol, service (not shown). DHCP services are commonly known.

Server 10 may be implemented using any computer device sufficient to support the server's planned function, such as software-based service applications that include a directory service, e-mail, file system and the like.

The term "memory store" is intended to include any device, such as a storage server, that is capable of providing at least read and write functionality to a requesting computing device, such as for example, system 2, clients 20-1 through 20-n and server 10. In accordance with one embodiment of the present invention, memory store 20 is implemented using any database server capable of communicating with another computing device on networked environment 4 using the SOAP protocol. For example, memory store 20 may be implemented using a database application, such as ORACLE, configured to operate on database server, such as the database server having model designation Oracle 9G, available form Oracle Corporation of Redwood City, Calif.

The SOAP protocol is commonly known and a protocol for exchanging XML-based messages over a computer network, such as computer network 22. HTTP (hypertext transfer protocol) and the XML language (extensible markup language) are also commonly known. The World Wide Web Consortium commonly referred to as W3C, currently maintain the specifications for SOAP and HTTP. Operating under control software 38, Collector 8 sends a request message to another node, such as memory store 20, which replies with an appropriate response message to collector 8.

Using a database server to implement memory store 20 is not intended to limit the scope and spirit of the various embodiments of the present invention disclosed here. One of ordinary skill in the art after receiving the benefit of the herein disclosure would readily recognize that memory store 20 may be implemented on a separate network, such as on a Storage Area Network, commonly referred to as a SAN, implemented using a network attached storage (NAS) device, or implemented using computing device 34 configured with a database application software and a mass storage device, such as hard disk drive or a mass storage array in either a JBOD (Just a Bunch of Disks) or RAID (Redundant Array of Independent Disks) configuration.

Management Software and Control Software.

Management software and control software are implemented in a selected programming language, such as C# or Java, and compiled for their target operating system, which for both applications in the example shown in FIG. 1, is the Linux® operating system. During operation, management software 28 executes on computing device 24 and communicates with packet processing engine 30 and control software 38. Control software 38 executes on computing device 34 and communicates with management software 28 and a server running a directory service, such as server 10 and directory service 14, respectively. Management software 28 communicates with packet processing engine 30 using a set of Application Program Interfaces (APIs), such as the programming and runtime libraries specific to the ENP-2611 packet processing engine.

Both management software 28 and control software 38 use the SOAP protocol, version 1.2, over HTTP to communicate with each other through network interfaces 32 and 40, respectively. Although network interfaces 32 and 40 are coupled to each other using computer network 22 of networked environment 4, it would be evident to one of ordinary skill in the art, that other approaches may be used, such as by coupling network interfaces 32 and 40 directly using a separate cable, eliminating the need to use networked environment 4. In addition, control software 38 uses the SOAP protocol to communicate with memory store 20 by using the protocol to read and query data stored on, or write data to, memory store 20.

Control software 38 also includes additional program code that uses the LDAP protocol to communicate with directory service 14. The use of the LDAP protocol is not intended to limit the scope and spirit of the various embodiments of the present invention disclosed herein. Other protocols may be used as long as the protocol selected is compatible with the type of directory service implemented on networked environment 4.

Further, control software 38 communicates with clients, such as clients 16-1 through 16-n, on networked environment 4 using the SMB protocol. Control software 38 includes program code that can structure and send a user account query to a selected client, such as client 16-1. The SMB protocol and user account query are compatible with clients using Microsoft Windows® branded operation systems, such as Windows® XP Professional. Those of ordinary skill in the art would readily recognize that control software 38 may be provided with additional program code that supports other types of network protocols for sharing of data, files, resources and permits authenticated inter-process communication between computing devices, such as collector 8 and client 16-1, on a computer network 22.

During operation, control software 38 obtains user information from a directory service and stores the user information in memory store 20. For example, control software 38 obtains the user information in the form of a user object and its respective attributes from directory service 14, and then stores these attributes in memory 20. The attributes stored may include user name, group, organizational unit or other attributes that are used to describe or are related to a real user.

Control software 38 instructs monitor 6, which is under program control by management software 28, to identify authentication exchange packets from network traffic transmitted on a networked environment, such as networked environment 4. The network traffic may be in the form of packets, such as packets 33, received by monitor 6 from attachment point 18. Control software 38 also instructs monitor 6 to extract user information and a source or destination network address from each authentication exchange packet identified.

For example, management software 28 may include program code that, in response to receiving a request from control software 38, will cause packet processing engine 30 to identify network packets that are of a certain type, such as authentication exchange packets, and to assert the proper signals on the expansion bus of computing device 24 so that monitor 6 can receive the identified authentication exchange packets and forward them to collector 8 operating under program control of control software 38. Management software 28 and control software 38 communicate using the SOAP protocol although the use of this protocol is not intended to limit the scope and spirit of the various embodiments of the present invention.

In accordance with an embodiment of the present invention, monitor 6 identifies authentication exchange packets from packets 33 by inspecting each packet and determining whether the inspected packet includes content that would indicate that it is an authentication exchange packet. For example, monitor 6 identifies a packet as an authentication exchange packet if it has a data structure that complies with the data structure defined by ASN.1 for Kerberos authentication exchange packets. In another example, monitor 6, identifies a packet as an authentication exchange packet if it contains a source or destination port ID of "88". Although a source or destination port ID of "88" is typically used by software applications to designate packets as Kerberos authentication exchange packets, identifying such packets by source or destination port ID may not be a reliable method of determining packet type since source or destination port ID designations may not be consistently used.

Upon receiving the extracted user information and network address, control software 38 determines whether the user information includes a user name that matches a user name attribute in one of the user objects attributes previously stored in memory store 20.

If so, control software 38 indicates that the authentication of real user 42-1 has been verified or may further verify the authentication of real user 42-1 by determining whether real user 42-1 is logged on to the client that initiated the authentication exchange.

If control software 38 determines that real user 42-1 is logged onto the client that initiated the authentication exchange, control software 38 sets a status flag associated with real user 42-1 to indicate the authentication of real user 42-1 has been verified. The use of a status flag to indicate the successful verification of the authentication of a real user, such as real user 42-1 is not intended to limit the various disclosed embodiments of the present invention in any way.

Determining whether a real user, such as real user 42-1, is logged onto the client that initiated the authentication exchange may be accomplished by including program code in control software 38 to request the hostname of the client from a name service, such as name service 46, available on networked environment 4. Control software 38 includes the network address extracted, which may be hereinafter referred to as the extracted network address, from the authentication exchange packet in the request submitted to name service 46. In response, name service 46 performs a reverse look-up and if a hostname exists that has been assigned the same network address as that of the extracted network address, name service 46 will reply with that hostname. The extracted network address may be in the form of a destination network address if extracted from an authentication exchange response packet or a source network address if extracted from an authentication exchange response packet.

After receiving the hostname from name service 46, control software 38 sends a user account query, or equivalent, to the client having the hostname sent by the name service. In response, the client will respond by providing control software 38 with a list of user accounts currently logged onto the client. Control software 38 will then review the list of user accounts to determine whether any of the user accounts on the list includes a user name that matches a user name from the extracted user information. If such a match is present, control software 38 sets an appropriate status flag for indicating that the authentication of real user 42-1 has been further verified.

Figure 4:
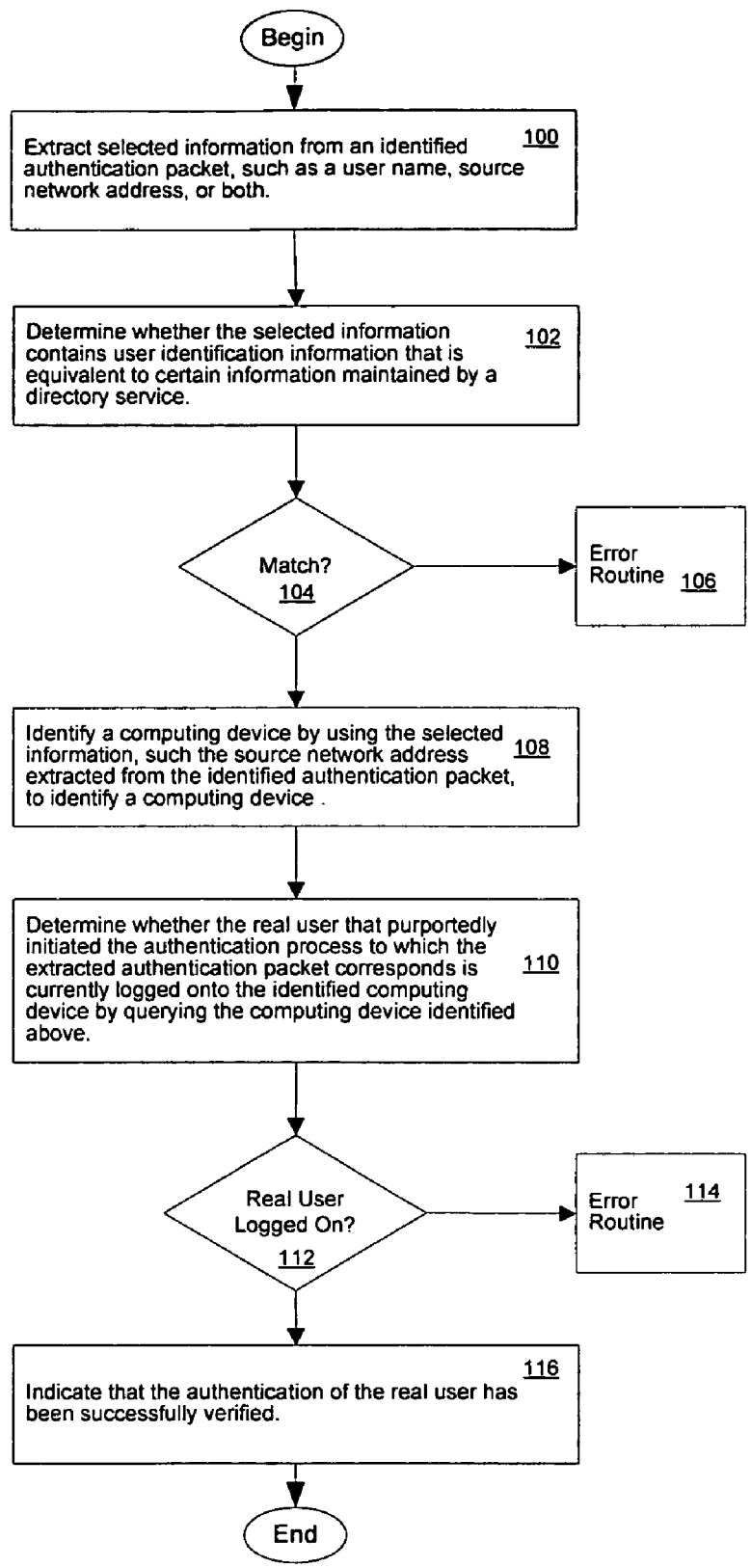
FIG. 4 is a block diagram flow for verifying the authentication of a real user in accordance with further still yet another embodiment of the present invention.

The following discussion refers to FIGS. 1 and 4. FIG. 4 depicts in block diagram form a method of verifying the authentication of real user, such as real user 42-1, who is attempting to log-on to a networked environment, such as networked environment 4, without requiring real user 42-1 to enter a user name or password in accordance with another embodiment of the present invention.

Verifying the authentication of a real user, such as real user 42-1, without explicitly requiring the real user to enter a user name and password is hereinafter referred to as "transparent authentication". The term "transparent authentication" is used herein instead of the term "authentication" since "authentication" is a term commonly used to describe a process by which a first entity, such as an authentication service, attempts to confirm the identity of a second entity, such as a real user or other network entity, from whom the first entity has received a communication, such as an authentication exchange request. One example of an authentication process is described in RFC 1510.

Attempting to log-on to a networked environment having a directory service causes an authentication process to occur, such as the authentication process defined by the Kerberos protocol. During the authentication process, real user 42-1 will attempt to log-on to networked environment by entering user information and a password on a computing device, such as client 16-1. Client 16-1 will then request credentials from an authentication service provided by networked environment 4. For example, this authentication service may be provided by directory service 14, which may be implemented using the Microsoft® Active Directory brand of directory services or equivalent.

Client 16-1 sends the request for credentials to the authentication service in the form of an authentication exchange request packet that includes the user name entered by real user 42-1 and other information, such as header information having the source network address of the client that sent the authentication exchange request packet, which in this example is client 16-1. Under the Kerberos protocol, the packet used to request credentials from an authentication service is commonly referred to as an authentication exchange request packet and includes a destination port ID of "88" besides, among other things, the user name and the source network address. Client 16-1 sends the authentication exchange request packet on a computer network, such as computer network 22.

Since many types of packets, not just authentication exchange packets are transmitted on a computer network 22, the network packets transmitted on the computer network 22 are monitored and authentication exchange packets are identified from the monitored packets. For example, monitoring may be accomplished using monitor 4 under program control by management software 28. Monitor 4 receives the network packets transmitted on computer network 22 from an attachment point, such as attachment point 18.

In FIG. 4, the method of verifying the authentication of a real user includes extracting 100 selected information, such as a user name, network address, or both, from an identified authentication exchange packet. In one example, the type of network address extracted is a destination network address if the type of authentication exchange packet selected to be identified is an authentication exchange response packet. In another example, the type of network address extracted is a source network address if the type of authentication exchange packet selected to be identified is an authentication exchange request packet.

The method also includes determining 102 whether the selected information extracted from the authentication exchange packet contains user information that is equivalent to certain information, such as a user name attribute held in a user object or other name attribute held in another type of object, such as a computer object, maintained by the directory service. For example, if the authentication exchange packet is a Kerberos authentication exchange packet, the selected information extracted includes a Kerberos principal name, which is in the form of an e-email address. If directory service 14 is implemented using Active Directory or an equivalent directory service, directory service 14 stores and manages user objects that each includes a name attribute formatted in the form of an e-mail address. Consequently, extracting selected information having a user name with a format that complies with the same format imposed on name attributes in user objects managed by a directory service, permits a proper comparison between the extracted user name and name attributes managed by the directory service.

If a match 104 is not found, the method includes entering 106 into an error routine, such as by setting a status flag indicating that authentication of a real user has not been verified.

Otherwise, the method initiates another process that relies on finding a match condition, such as a process that sets a status flag indicating that authentication of a real user has been verified (not shown), or such as a process that further improves verification accuracy. Improving verification accuracy may include identifying 108 a computing device on networked environment 4 by using the selected information, such as the network address extracted from the identified authentication exchange packet. Identifying 108 a computing device using the extracted network address may be accomplished using a name service, such as name service 46.

The process further includes determining 110 whether the real user that purportedly initiated the authentication process, and which the extracted authentication exchange packet corresponds, is currently logged onto the identified computing device. This may be accomplished by querying the identified computing device. The type of query used may be of the user account type for computing devices that use Windows-based operating systems, while the "who" shell remote command may be used for computing devices that operate using the UNIX operating system or its variants.

For example, if a user account query is used, the user account query is sent to the identified computing device. In response, the computing device will respond by providing with a list of user accounts currently logged onto the computing device, if any. This list of user accounts will be reviewed to determine whether any of the user accounts on the list includes a user name that matches the user name from the extracted selected information.

If 112 a match is not found, the process enters 114 into an error routine, such as by setting an error flag.

Otherwise, the process enters 116 into a suitable routine, such as by setting a status flag for indicating that the authentication of the real user has been verified or by triggering a process for displaying an appropriate on-screen message.

The method disclosed in FIG. 4 is not intended to be limited to the order listed but may be implemented in any order sufficient to successfully perform the method.

While the present invention has been described in particular embodiments, it should be appreciated that the present invention should not be construed as limited by such embodiments. Rather, the present invention should be construed according to the claims below.

What is claimed is:

1. A system for verifying the authentication of a real user attempting to log onto a networked environment by using a computing device, the real user entering a user name as part of the attempt to log on, wherein the networked environment includes a directory service that maintains objects representing network entities, the network entities including the computing device and the real user, the system comprising:

a memory;

a monitor configured to extract user information from an authentication exchange packet transmitted on the networked environment, the selected information including a user name;

a collector configured to determine whether the user name matches a user name attribute of an object maintained by the directory service; and the system is further configured to indicate that the authentication of the real user has been verified if the user name matches the user name attribute.

2. The system of claim 1 wherein the monitor is further configured to:

extract a source network address from the authentication exchange packet if the authentication exchange packet is identified as an authentication exchange request packet; and identify a computing device associated with the source network address; and the collector is further configured to query the computing device to determine whether a user account having the user name attribute is logged onto the computing device.

3. The system of claim 1 wherein
the monitor is further configured to extract a destination network address from the authentication exchange packet if the authentication exchange packet is identified as an authentication exchange response packet;
the system is further configured to identify a computing device associated with the destination network address; and
the collector is further configured to query the computing device to determine
whether a user account having the user name attribute is logged onto the computing device.

4. The system of claim 3 wherein the collector is further configured to indicate that the authentication of the real user has been further verified if it is determined that the user account is logged onto the computing device.

5. The system of claim 3 wherein the system is further configured to identify the computing device using a name service.

6. The system of claim 1 wherein the user name and the user name attribute have the same format.

7. The system of claim 1 wherein the objects include user objects.

8. A computer program embodied on at least one computer-readable medium for executing a method for verifying the authentication of a real user attempting to log onto a networked environment by using a computing device, the real user entering a user name as part of the attempt to log on, the method comprising:
at the computing device, extracting selected information from an authentication exchange packet transmitted on the networked environment, the selected information including a user name;
determining whether the user name from the selected information matches a name attribute maintained by a directory service;
initiating a routine if the user name matches the user name attribute; and
wherein the networked environment includes the directory service, the directory service for storing and maintaining objects and attributes that represent network entities on the networked environment, the network entities including the computing device and real users.

9. The computer program of claim 8, the method further comprising:
extracting a network address from the authentication exchange packet, the network address in the form of a destination network address if the authentication exchange packet is a response packet, or in the form of source network address if the authentication exchange packet is a request packet;
identifying a computing device associated with the network address; and
querying the computing device to determine whether a user account having the name attribute is active on the computing device.

10. The computer program of claim 9, the method further including indicating that the authentication of the real user has been verified.

11. The computer program of claim 9 wherein the identifying includes using a name service.

12. The computer program of claim 8 wherein the user name from the selected information and the user name attribute follow the same format.

13. The computer program of claim 8 wherein the objects include user objects.

14. A system for verifying the authentication of a real user seeking to log onto a networked environment, wherein the networked environment includes at least one computing device, a directory service, an authentication service and a name service, and wherein the directory service maintains user objects, the system comprising:
a memory;
a monitor configured to receive network packets traversing through the networked environment;
a collector configured to connect to the monitor and the networked environment;
wherein the monitor includes program code configured to identify an authentication exchange packet from the network packets and if found, extracts user information from the authentication exchange packet, and sends the users information to the collector; and
wherein the collector includes program code configured to obtain at least one user object from the directory service and determines whether the user information includes a user name that is equivalent to a name attribute from at least one user object, and perform a predetermined routine if the name attribute is found equivalent to the user name.

15. The system of claim 14, further comprising a memory store for storing the at least one user object.

16. The system of claim 15 wherein the memory store is a database.

17. The system of claim 15 wherein the memory store is a database server accessible using the networked environment.

18. The system of claim 17 wherein the collector comprises a first computing device and the monitor further comprises a second computer device coupled to the packet processing engine and the first computing device.

19. The system of claim 14 wherein the monitor comprises a packet processing engine having at least one network port for receiving network packets transmitted on the networked environment.

20. The system of claim 14 wherein the networked environment comprises an attachment point for sending the network packets to the monitor without impeding the routing of the network packets on the networked environment.

21. The system of claim 14 wherein the networked environment comprises an attachment point implemented using a network switch having a span port.

22. The system of claim 14 wherein the networked environment comprises an attachment point implemented using a network switch having a mirror port.

23. The system of claim 14 wherein the monitor and the collector are provided as software applications on a computing device.

24. The system of claim 14 wherein the program code of the monitor and the program code of the collector are configured to execute from a single computing device.

25. A system for verifying the authentication of a real user having a user account defined on a networked environment, wherein the networked environment includes at least one computing device, a directory service, an authentication service and a name service, and wherein the directory service is configured to maintain user objects, the system comprising:
a memory;
a monitor configured to receive network packets traversing through the networked environment;

a collector configured to connect to the monitor and the networked environment;

wherein the monitor includes program code configured to identify an authentication exchange request packet from the network packets and if found, extract user information from the authentication exchange request packet, and sends the user information to the collector; and wherein the collector includes program code configured to obtain at least one user object from the directory service and determine whether the user information includes a user name that is equivalent to a name attribute from at least one user object, and perform a predetermined routine if the name attribute is found equivalent to the user name.

26. The system of claim 25 wherein:

the program code of the monitor is further configured to extract a destination network address from the authentication exchange response packet and send the destination network address to the collector;

the program code of the collector is further configured to obtain a hostname from the name service using the destination network address, and if the program code receives the hostname, the program code performs a user account query using the hostname to determine whether a user account associated with the name attribute is active on a computing device defined with the hostname; and if the program code of the collector finds the user account active on the computing device, the collector performs another predetermined routine indicating further verification of the authentication of the real user.

27. The system of claim 26 wherein the predetermined routine and the another predetermined routine are substantially equivalent.

28. The system of claim 26 wherein the memory store is a database.

29. The system of claim 25, further comprising a memory store for storing the at least one user object.

30. The system of claim 25 wherein the monitor comprises a packet processing engine having at least one network port for receiving network packets transmitted on the networked environment.

31. The system of claim 30 wherein the collector includes a first computing device and the monitor further includes a second computer device coupled to the packet processing engine and the first computing device.

32. The system of claim 25 wherein the networked environment comprises an attachment point for sending the network packets to the monitor without impeding the routing of the network packets on the networked environment.

33. The system of claim 25 wherein the authentication exchange response packet complies with the authentication protocol used by the authentication service.

34. A system for verifying the authentication of a real user seeking to log onto a networked environment, wherein the networked environment includes at least one computing device, a directory service, an authentication service and a name service, and wherein the directory service is configured to maintain user objects, the system comprising:

a memory;

a monitor configured to receive network packets traversing through the networked environment;

a collector configured to connect to the monitor and the networked environment;

wherein the monitor includes management software configured to identify an authentication exchange response packet from the network packets and if found, extracts user information and a destination network address from the authentication exchange response packet and sends the user information and the destination network address to the collector;

wherein the collector includes control software configured to obtain at least one user object from the directory service, determines whether the user information includes a user name that is equivalent to a name attribute from one of the at least one user object, and determines whether a user account associated with the user name is currently active on a computing device on the networked environment; and wherein the control software is configured to indicate the successful verification of the authentication of the real user if the name attribute is found equivalent to the user name and the user account is found active on the computing device.

35. The system of claim 34 wherein the control software is configured to obtain a hostname associated with the computing device by querying the name service using the destination network address.

36. The system of claim 35 wherein the memory store is a database.

37. The system of claim 34, further comprising a memory store for storing the at least one user object.

38. The system of claim 34 wherein the monitor comprises a packet processing engine having at least one network port for receiving network packets transmitted on the networked environment.

39. The system of claim 38, wherein the collector comprises a first computing device and the monitor further comprises a second computer device coupled to the packet processing engine and the first computing device.

40. The system of claim 34 wherein the networked environment comprises an attachment point for sending the network packets to the monitor without impeding the routing of the network packets on the networked environment.

41. A system for verifying the authentication of a user on a networked environment, wherein the networked environment provides directory, authentication and name services to devices connected thereto, the system comprising:

a memory;

a monitor configured to receive and inspect network packets transmitted on the networked environment, the monitor further configured to identify at least one authentication exchange response packet from the network packets, the authentication exchange response packet containing at least a principal name; and a collector configured to use information managed by the directory service to verify the user principal name.

42. The system of claim 41 wherein the directory service is configured to maintains at least one user object, and the system is further configured to:

determine whether one of the user objects includes a name attribute that is equivalent to the principal name; and set an indicator if the name attribute is equivalent to the principal name.

43. The system of claim 42 wherein a LDAP-based directory service application provides the directory service.

44. The system of claim 42 wherein the Active Directory@ directory service software application provides the directory service.

45. The system of claim 42 wherein the authentication exchange response packet further includes a destination network address.

46. The system of claim 45 wherein the name service maps at least one client name to a network address; and the system is further configured to determine whether the name service maintains a client name have a network address equivalent to the destination network address and if so, query a client having the client name to determine whether a user account containing a user name that is equivalent to the principle name is logged onto to the client.

47. The system of claim 41 wherein the provision of the authentication services comprises using the Kerberos protocol.

48. The system of claim 41 wherein the principal name is a user name formatted as an email address.

* * * * *